INVENTOR
ROBERT K. VALKS

United States Patent Office 3,543,300
Patented Nov. 24, 1970

3,543,300
DIE SHIFTING MECHANISM FOR
EXTRUSION PRESS
Robert K. Valks, Penfield, N.Y., assignor to Farrel Corporation, Rochester, N.Y., a corporation of Connecticut
Filed Sept. 24, 1968, Ser. No. 762,049
Int. Cl. B21c 23/00
U.S. Cl. 72—255       7 Claims

ABSTRACT OF THE DISCLOSURE

The die carrier and the associated supporting pressure bolsters are mounted in a die slide on an extrusion press. A reciprocable locking member in the slide is releasably engaged in an annular groove in the carrier to secure the carrier against axial movement relative to the bolsters during extrusion. After a billet has been extruded, the locking member is released, and movable detents on the billet container of the press are urged radially inwardly to engage in a peripheral groove in the carrier to secure the carrier releasably to the container, which then retracts with the pressing stem or ram away from the slide, moving the carrier away from the bolsters far enough for a saw or other cutting device to sever the extruded product.

---

A metal extrusion press is equipped with a platen, a billet container, a pressing stem or ram, an extrusion die and a backer therefor, and supporting pressure bolsters. The extrusion die normally is held in a carrier which may also contain the die backing ring. The ram is driven through the billet container to extrude the billet through the die. The billet is usually not completely extruded by this operation; and the trailing or butt end of the billet remains in the die, when the ram completes its extrusion stroke. It is necessary, therefore, to shear the extruded product from the butt end of the billet.

It is an object of this invention to provide an improvement in an extrusion press which will allow more room for a saw or other extrusion member to effect the shearing operation.

Another object of the invention is to provide a press in which the extrusion die is moved away from the supporting bolsters, when the extrusion operation is completed, for the purpose of severing the extruded product between the die and the supporting bolsters.

Other objects of the invention will be apparent hereinafter from the specification and from the recital of the appended claims, particularly when read in conjunction with the accompanying drawings.

Figure 1:
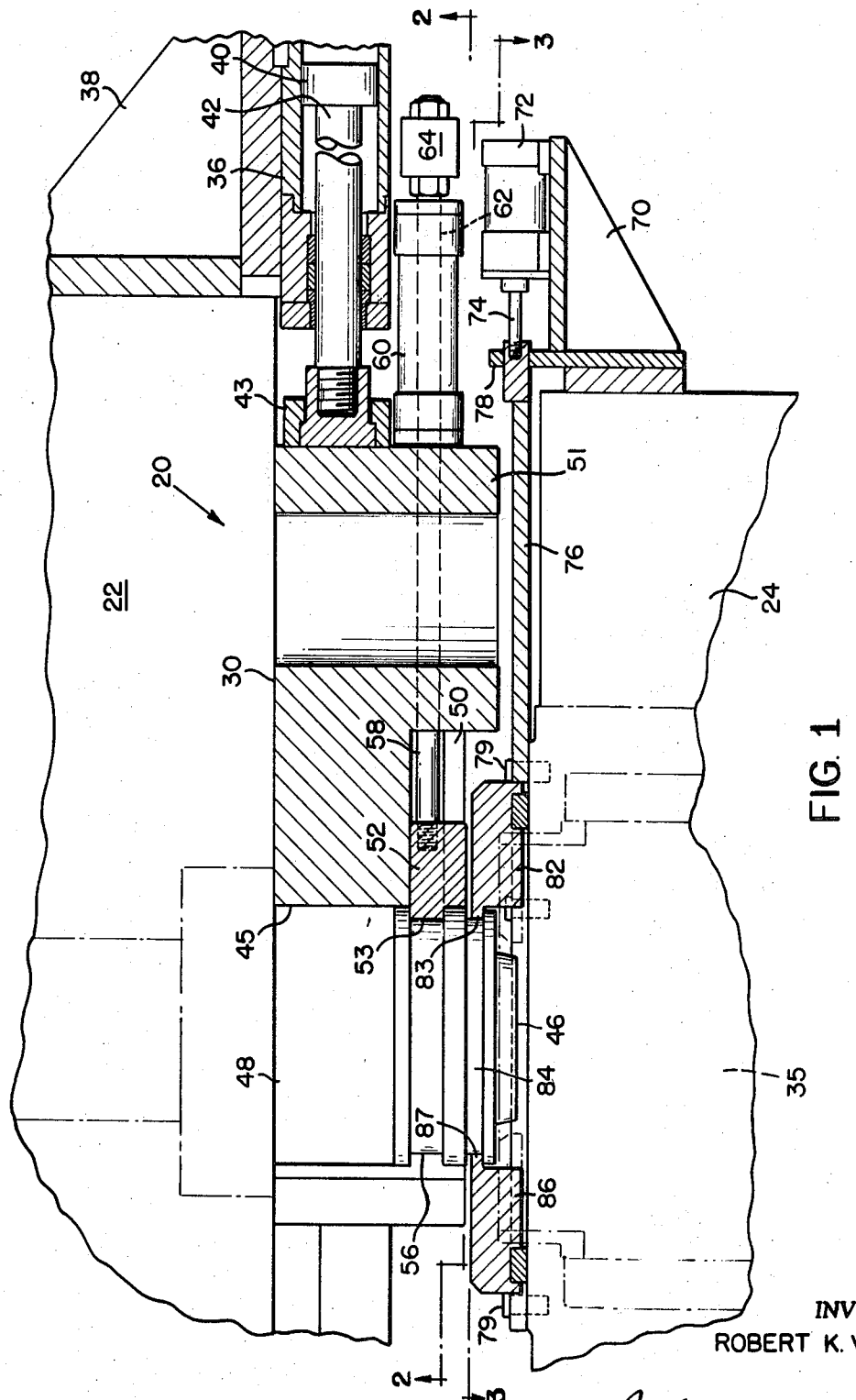
FIG. 1 is a fragmentary plan view illustrating partly in section the die slide and billet container of an extrusion press made in accordance with one embodiment of this invention.

Referring now to the drawings by numerals of reference, 20 denotes generally a die slide assembly of an extrusion press which has the conventional end platen 22, main tie bolts 23 (FIG. 2) and a housing 24 for the billet container. Housing 24 is mounted in the usual manner on rods 25 (FIGS. 2 and 3) for axial reciprocation.

Assembly 20 comprises a slide 30, which is reciprocable in guides 32 and 34 for rectilinear sliding movement on the front face of platen 22 transversely of the axis of the container 35 (FIG. 3) which is mounted in housing 24. Slide 30 is actuated by a piston 40 which reciprocates in a cylinder 36, which is fixed by a bracket 38 to the platen 22. Piston 40 is connected by piston rod 42 and coupling 43 to slide 30.

Removably seated in an arcuate, generally U-shaped slot 45 in slide 30 are a cylindrical die carrier 46, and its associated bolster assembly 48 (FIG. 1). The forward end of the die carrier projects axially beyond the corresponding end of groove 45. The carrier 46 has an axial bore 47 in which a die (not illustrated) is adapted to be fixed in the usual manner. The opening in groove 45 in slide 30 faces diagonally upwardly toward the left in FIG. 2, so that the carrier 46 and its associated bolster assembly 48 may be inserted into, or withdrawn from, the groove 45 radially upwardly as indicated by arrow 49 in FIG. 2.

Mounted for rectilinear sliding movement perpendicular to the axis of carrier 46 in a recess 50 in the face of slide 30, and slidably guided in a groove in the bottom of guide 32, is a yoke-shaped locking member or gate 52. Member 52 has an arcuate surface 53 at one end, adapted to seat in a peripheral groove 56 formed in the periphery of die carrier 46, thereby to secure the die carrier against axial movement in the groove 45 of slide 30.

Member 52 is secured to a pair of spaced, parallel rods 58 and 59, which extend slidably through the laterally protruding portion 51 of slide 30 to a cross plate 64 which is connected by a piston rod 62 to a piston (not illustrated) that reciprocates in cylinder 60 fastened to the outside of slide 30.

Mounted by a bracket 70 (FIGS. 1 and 3) on the side of the container housing 24 are two cylinders 72 and 73. The piston rods 74 and 75, which project from these cylinders, are secured at their outer ends to the right-hand ends (FIG. 3) of arms 76 and 77, respectively, which are disposed at the rear of the container housing 24. These arms are slidably guided in a plate 78, that is part of bracket 70; and they slide on headed pins 79. These pins project from the rear face of housing 24 through registering slots 80 in the arms 76 and 77.

Figure 3:
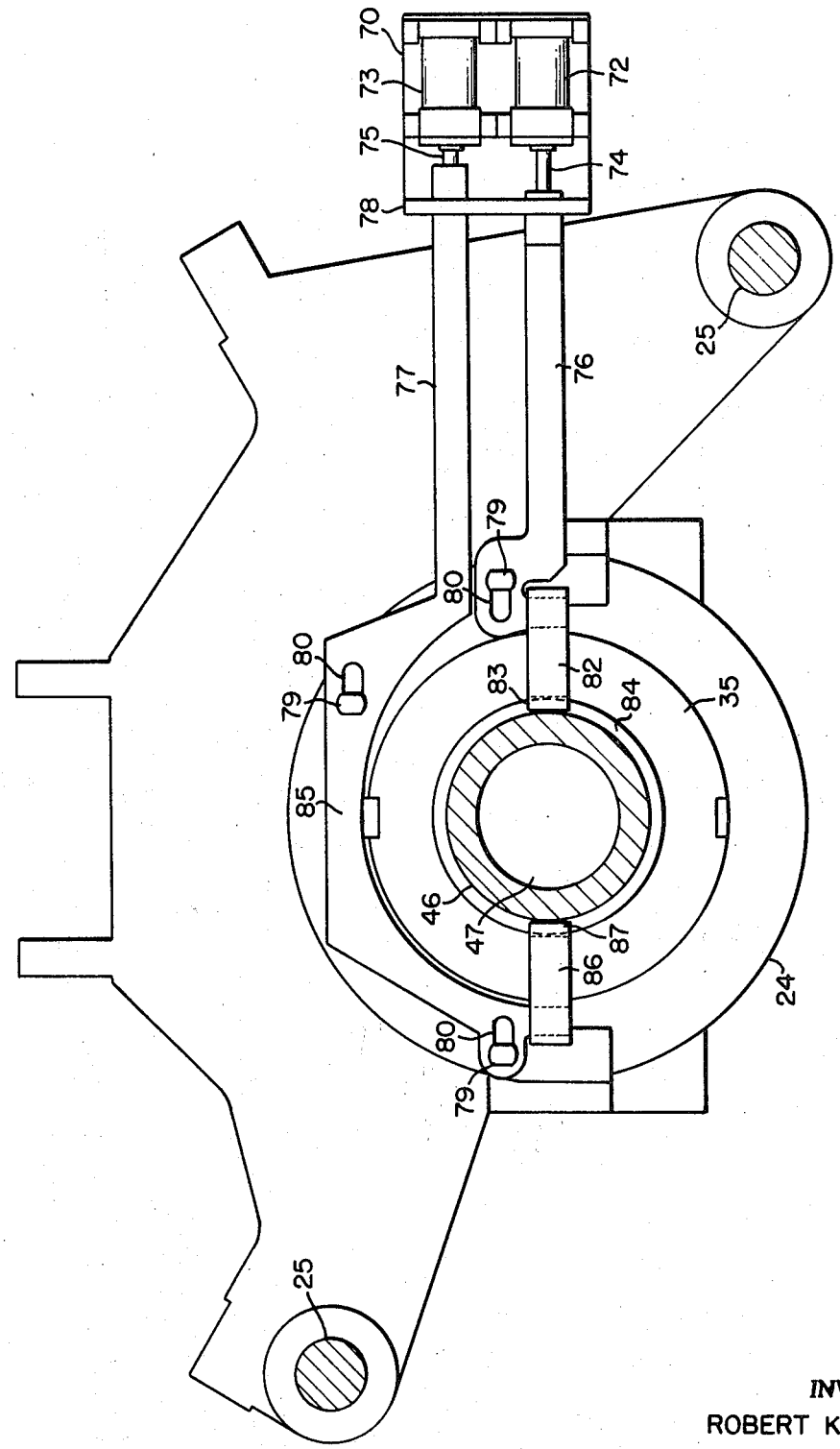
FIG. 3 is a fragmentary sectional view taken along the line 3—3 in FIG. 1 looking in the direction of the arrows.

As shown more clearly in FIG. 3, arm 76 extends from the plate 78 substantially directly radially toward the carrier 46, and has attached to its free end a detent or latch 82. This detent extends radially across container 35, and has a projecting portion 83, which engages in a peripheral recess 84 (FIGS. 1 and 3) that is formed in die carrier 46. Arm 77 has an offset section 85 extending transversely across housing 24 below container 35 with a depending portion extending upward to a point substantially diametrally opposite detent 82. Attached to this depending portion of arm 77 below one of its two guide slots 80 (FIG. 3) is a detent 86, which extends radially across container 35 at a point diametrally opposite detent 82. At its inner end detent 86 has an integral projection 87, which seats in the groove 84 of the die carrier 46 diametrally opposite the projection 83 on detent 82.

Figure 2:
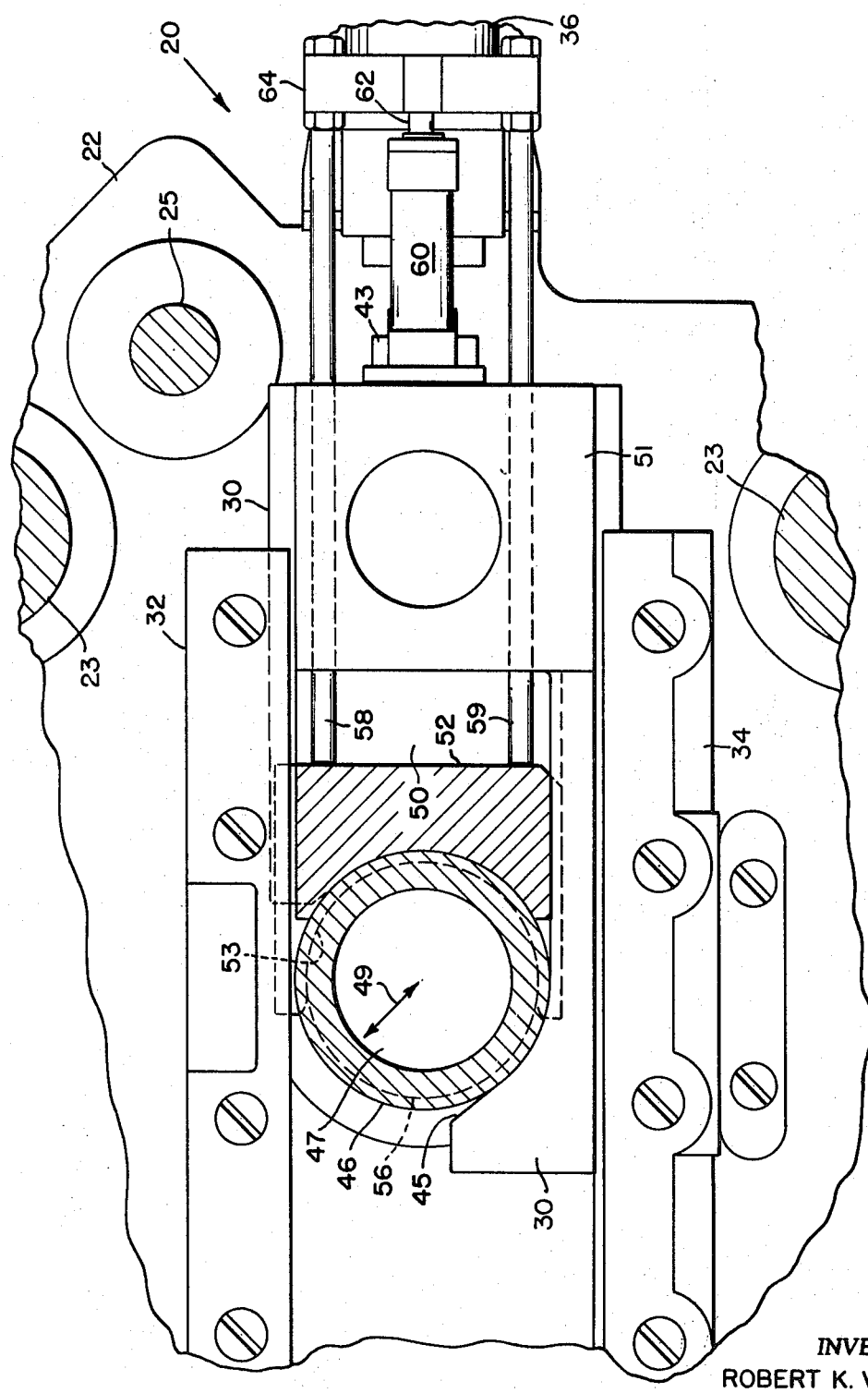
FIG. 2 is a fragmentary sectional view taken along the line 2—2 in FIG. 1 looking in the direction of the arrows.

In operation, when the extrusion stroke is completed, the piston in cylinder 60 is actuated to shift the piston rod 62, and hence cross member 64, toward the right in FIGS. 1 and 2. This causes the rods 58 and 59 to draw the gate or locking member 52 toward the right in FIGS. 1 and 2, far enough to disengage its forked end from the peripheral groove 56 in carrier 46. This releases die carrier 46 from the bolster assembly 48 so that the die carrier can be moved axially out of slot 45 and with container housing 24.

Simultaneously with the shifting of locking member 52 to released position, or, alternatively, after member 52 has reached released position, the pistons in cylinders 72 and 73 are actuated to shift their piston rods 74 and 75 in opposite directions to engage the ends 83 and 87, respectively, of the detents 82 and 86, in the groove 84 in the die carrier 46 so as to lock the die carrier to the container 35.

Then the container housing 24 is shifted away from bolster assembly 48 and the end platen 22 (downwardly in FIG. 1) in the usual manner and by usual means. However, in the present press, the die carrier 46 is secured to the container at this time by the detents 82 and 86, so that as the container housing 24 is retracted, the die carrier 46 is pulled axially away from the bolster assembly 48. Consequently a gap is produced between the die carrier 46 and bolster assembly 48 into which a saw or other cutting device can be introduced to sever the extruded product.

After the billet has been severed, the container housing 24 is returned in the usual manner and through the usual means back to the position illustrated in FIG. 1, thereby once again positioning the die carrier against the bolster assembly 48, so that the die carrier is closed into the slide, and the annular groove 56 in carrier 46 will once again register with the forked end of the locking member 52. Then the pistons in cylinders 60, 72 and 73 are actuated to advance the forked end of member 52 (to the left in FIGS. 1 and 2) into engagement with groove 56 in die carrier 46 to lock the die carrier into the slide and fix the die carrier against axial movement relative to the bolster assembly 48, and to withdraw the latching detents 82 and 86 radially competely from groove 84 in die carrier 46, thus releasing the die carrier from the container.

From the foregoing it will be apparent that the instant invention provides relatively simple means for shifting the die carrier axially out of engagement with the bolster assembly 48 in the die slide or carrier 30 so that at the end of the extrusion operation the billet will be exposed for shearing purposes.

It is to be understood that the pistons in cylinders 60, 72 and 73 and the piston in cylinder 36 are scheduled to operate at predetermined times during the normal cycle of the press operation. Moreover, while the container 35 may serve as one of the supports for the detents 82 and 86, it will be apparent that, if desired, these detents could be wholly supported on the face of container housing 24 for movement by hydraulic or mechanical means attached to the container housing 24.

While the invention has been described in connection with a specific embodiment thereof, it will be understood, then, that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. In an extrusion press having a supporting pressure bolster, a die carrier disposed in front of said bolster, and a container and container housing movable toward and away from said bolster,
   a locking member mounted for movement between a locking position in which it engages said carrier to secure the carrier against movement relative to said bolster toward said container housing, and a released position in which it is disengaged from said carrier so that the carrier may be moved with said container housing, and
   movable clamping means engageable with said carrier releasably to secure said carrier to said container for movement therewith away from said bolster, when said locking member is in its released position, thereby to shift said carrier away from said bolster to provide space between said carrier and bolster to permit severing the extrusion between said carrier and bolster.

2. In an extrusion press as defined in claim 1, wherein said die carrier has a peripheral recess,
   said locking member is mounted for reciprocable movement radially of said carrier, and
   said locking member has a portion engageable in said recess to secure said carrier to said bolster, when said locking member is in its locking position.

3. In an extrusion press as defined in claim 1, wherein said container has a central bore,
   said clamping means comprises two detents mounted to reciprocate radically of said bore between clamping and released positions, respectively, and
   each of said detents seats in a recess in said carrier, when said detents are in clamping positions, and is disengaged from the last-named recess, when said detents are in their released positions.

4. A mechanism as defined in claim 3, wherein said carrier has in its outer peripheral surface a pair of axially spaced annular recesses,
   one of said annular recesses registers radially with said locking member, when said carrier is positioned in contiguity with said bolster, and
   the other of said annular recesses registers radially with said detents, when said housing is in its advanced position relative to said bolster.

5. An extrusion press as defined in claim 3, wherein said detents engage, respectively, in different portions of said recess in said carrier when in their clamping positions, and having:
   a pair of arms mounted for limited reciprocable movement transverse to the axis of said bore, and operatively connected to said detents to shift said detents radially into and out of clamping engagement with said recess in said carrier.

6. An extrusion press as defined in claim 5, wherein said detents engage, respectively, in diametrally opposite portions of said recess in said carrier, and
   means is provided for moving said arms simultaneously in opposite directions.

7. An extrusion press as defined in claim 5, having:
   a plurality of headed pins projecting from said housing slidably through registering slots in said arms slidably to support said arms at one point along their lengths, and
   a bracket secured to one side of said housing and slidably supporting said arms at another point along their lengths,
   one of said arms extending substantially directly radially from said bracket toward the axis of said bore in said container, and
   the other of said arms having an offset portion extending around the outside of said bore so that the detent supported thereby is positioned diametrally opposite the detent supported by said one arm.

References Cited

UNITED STATES PATENTS

| | | | |
|---|---|---|---|
| 2,954,869 | 10/1960 | Swanson | 72—263 |
| 3,147,863 | 9/1964 | Rosenthal | 72—255 |
| 2,960,220 | 11/1960 | Katko | 72—263 |
| 3,217,527 | 11/1965 | Elger | 72—263 |
| 3,357,226 | 12/1967 | Snell | 72—263 X |
| 2,738,063 | 3/1956 | Billen | 72—263 |
| 2,896,782 | 7/1959 | Billen | 72—255 |

CHARLES W. LANHAM, Primary Examiner

A. L. HAVIS, Assistant Examiner

U.S. Cl. X.R.

72—263